July 15, 1924.
A. R. BECKERT
INDICATING INSTRUMENT
Filed Aug. 6, 1920
1,501,698
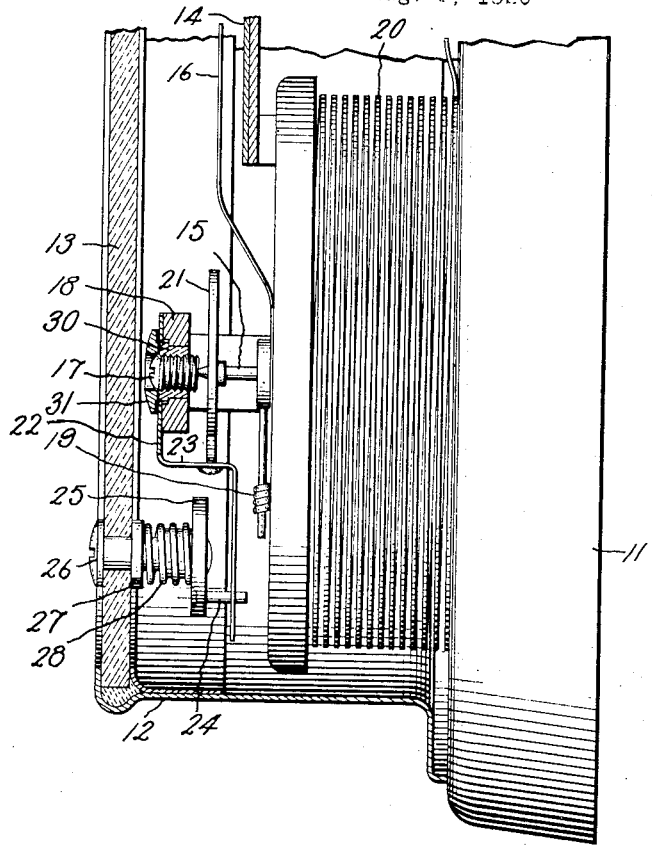
Fig. 1.
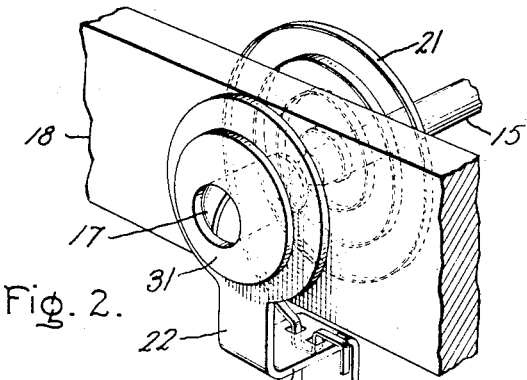
Fig. 2.
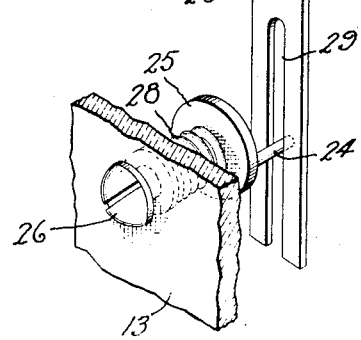
Inventor:
Albert R. Beckert,
by Albert G. Dunn
His Attorney.

Patented July 15, 1924.

1,501,698

UNITED STATES PATENT OFFICE.

ALBERT R. BECKERT, OF LYNN, MASSACHUSETTS, ASSIGNOR TO GENERAL ELECTRIC COMPANY, A CORPORATION OF NEW YORK.

INDICATING INSTRUMENT.

Application filed August 6, 1920. Serial No. 401,805.

*To all whom it may concern:*

Be it known that I, ALBERT R. BECKERT, a citizen of the United States, residing at Lynn, in the county of Essex, State of Massachusetts, have invented certain new and useful Improvements in Indicating Instruments, of which the following is a specification.

My invention relates to indicating instruments, and particularly to electrical instruments the movable elements of which are controlled by springs.

The usual arrangement for supplying the torque which is opposed to the movement of the needle or pointer of an indicating instrument comprises a spirally wound flat spring, one end of which, usually the inner, is attached to the shaft carrying the pointer, while the outer end is attached in some manner to a relatively stationary member. During the process of manufacture, however, it becomes necessary to adjust the initial torque exerted by these so-called control springs upon the movable element. This is usually accomplished either by winding up the outer end of this control spring, or by letting it run down slightly. The outer end is then permanently attached to the stationary member. Heretofore this has been done by soldering or by twisting the end of the control spring sharply about its support. These methods have inherent disadvantages, since the sharp bends may cause the spring to take a set, due to vibrations; and if solder is used it is difficult to make the adjustment very accurately. It is the object of my invention to do away with these disadvantages. To this end, I supply apertures in the stationary member to which the control spring is to be fastened, and then thread the end of this control spring through these apertures. By pulling the control spring more or less through these apertures, it is possible to adjust it very accurately. After this adjustment is made, it is possible to retain the end of the spring in its proper position by either bending it over or by placing a drop of solder or pitch on it to insure against the end pulling out.

The construction and mode of operation of my invention will be understood from the following description taken in connection with the drawings, in which Fig. 1 is a sectional view of a portion of an instrument incorporating my invention; and Fig. 2 is an enlarged perspective, showing more clearly how the adjustments may be made.

Referring now more in detail to the drawings in which like numerals refer to like parts throughout, the particular instrument chosen to illustrate the invention has a supporting base 11 and an enclosing case 12 having therein a front 13 so arranged that the scale 14 is visible therethrough. The movable element 15 of the instrument carries the pointer 16 and is pivoted in a pivot screw 17 appropriately threaded through a bushing 30 held in a stationary strap 18. An adjustable counter-weight 19, in this case shown as comprising a few turns of spring wire is adapted to balance the weight of this movable element. An operating coil of the instrument is shown generally by the numeral 20, but it is understood that other means for influencing the movable element may be utilized.

For the purpose of producing the torque opposed to the movement of the pointer 16, use is made of a spirally wound control spring 21 made in this instance of a relatively thin ribbon of resilient material, such as phosphor-bronze or steel. The inner end of this control spring 21 is fastened appropriately to the shaft of the movable element 15, as clearly shown in Fig. 2. For the purpose of adjusting the tension of this spring 21, I employ a relatively stationary member 22, having a horizontal bent-in portion 23, in which there are provided a plurality of apertures. Through these apertures, as indicated in Fig. 2, the outer end of the control spring is threaded, and by proper manipulation it is possible to wind up this spring to any required extent. This is for the purpose of making the pointer indicate just exactly the full length of the scale when the maximum measurable quantity is to be indicated. This construction facilitates the adjusting operation and has advantages in that there is no liability for the controlled spring to have a set under later conditions of operation. To provide for finer adjustment after the instrument is installed, I use a crank pin 24 cooperating with a slot 29 located in the member 22. The pin 24 is carried by a disc 25 adapted to be rotated by means of a screw-headed rod 26, passing through the front cover 13 of the instrument. This rod 26 frictionally engages the cover 13 underneath its head. For effecting this frictional engagement, use is made of the washer 27 pressed against the inner surface of the cover 13 by means of the spring 28 disposed on the rod 26, between the washer 27 and disc 25. The member 22 is pivoted in this case about the same center as the movable element 15, upon the bushing 30 located in the stationary member 18 and is held in its proper position by the check nut 31 provided for the bearing screw 17. It is evident that when the crank pin 24 is rotated by rotation of the rod 26, a slight angular adjustment of the member 22 is effected.

While I have shown one embodiment of my invention in the accompanying drawings, I do not wish to be limited thereto but aim to embrace in the appended claims all modifications falling fairly within the scope of my invention.

What I claim as new and desire to secure by Letters Patent of the United States, is:—

In an indicating instrument, a spirally wound control spring for the movable element, and an angularly adjustable member having non-aligned apertures through which the outer end of the control spring is loosely threaded.

In witness whereof, I have hereunto set my hand this second day of August, 1920.

ALBERT B. BECKERT.